United States Patent [19]
Cavatassi

[11] 3,797,204
[45] Mar. 19, 1974

[54] SMOKE WASHER APPARATUS

[76] Inventor: Dominic Cavatassi, 362 Main St., Follansbee, W. Va. 26037

[22] Filed: Nov. 11, 1971

[21] Appl. No.: 197,860

[52] U.S. Cl. .......................... 55/227, 55/228, 261/17, 261/DIG. 9, 261/116
[51] Int. Cl. ............................................. B01d 47/06
[58] Field of Search ................. 55/227, 228, 93, 94; 261/17, DIG. 9, 115–118

[56] References Cited
UNITED STATES PATENTS

| | | | |
|---|---|---|---|
| 468,378 | 2/1892 | Wills | 261/17 |
| 1,791,814 | 2/1931 | Hillery | 261/116 |
| 1,828,646 | 10/1931 | Dantsizen | 55/228 |
| 3,406,098 | 10/1968 | Humez et al. | 261/DIG. 9 |
| 3,613,333 | 10/1971 | Gardenier | 55/228 |
| 3,668,841 | 6/1972 | Nunn | 55/257 |
| 3,640,054 | 2/1972 | Katz | 55/228 |
| 906,423 | 12/1908 | Hockman | 261/DIG. 9 |
| 3,572,264 | 3/1971 | Mercer | 261/DIG. 9 |
| 3,713,277 | 1/1973 | Sackett, Sr. | 261/118 |

*Primary Examiner*—Bernard Nozick
*Attorney, Agent, or Firm*—Shlesinger, Arkwright, Garvey & Dinsmore

[57] ABSTRACT

Smoke washer apparatus which includes a smokestack having an exhaust flue in communication therewith. A series of sprinkler heads is located in the exhaust flue for spraying a curtain of water generally in the direction of the smokestack as that as exhaust passes through the flue, the curtain of water removes particulate and those gases soluble in water. The contaminant-laden water gravitates to a collection tank and the cleaned smoke is directed to the smokestack for emission to the atmosphere. The contaminant is removed from the collection tank and the water recycled to the sprinkler heads.

5 Claims, 1 Drawing Figure

PATENTED MAR 19 1974  3,797,204
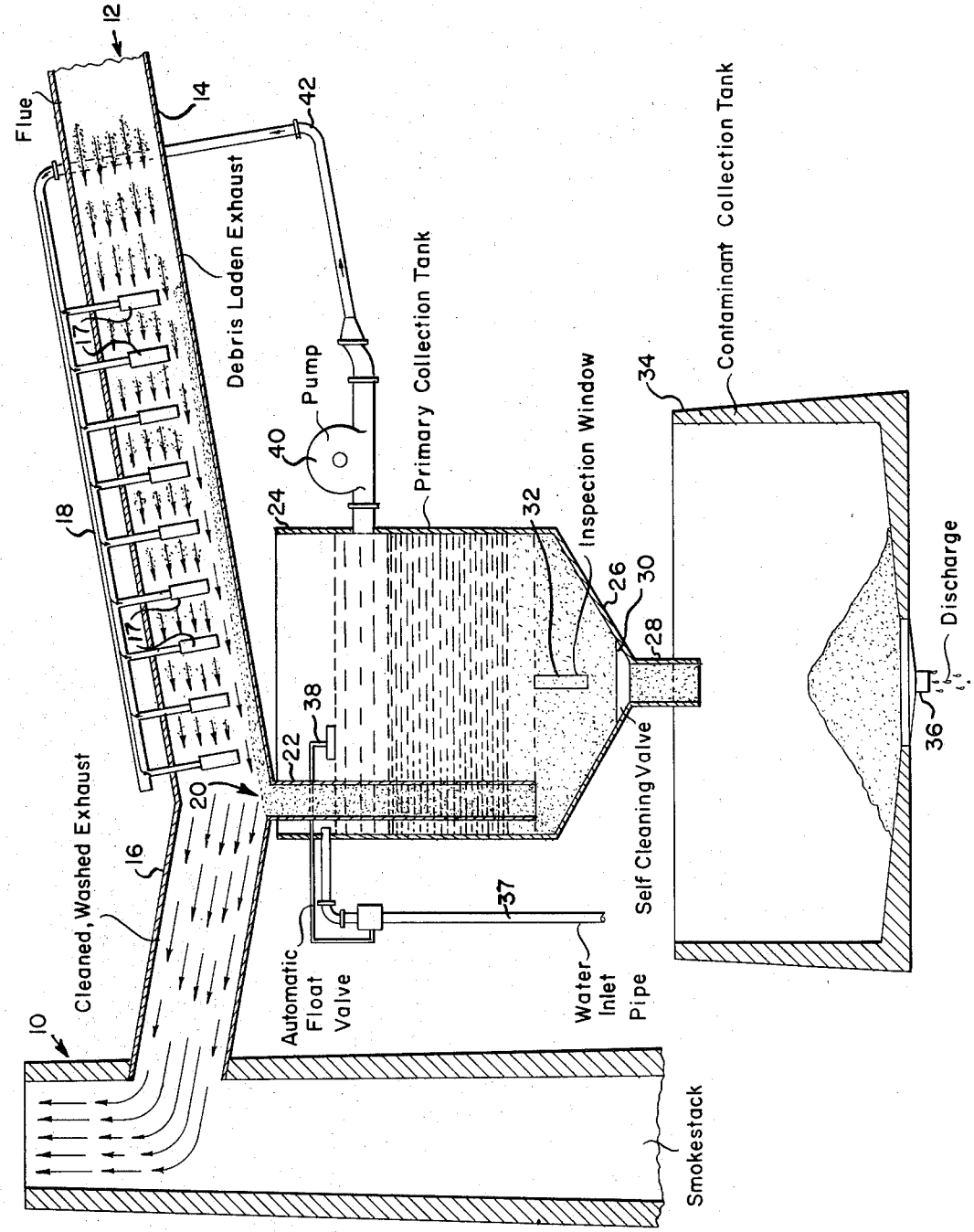
INVENTOR
Dominic Cavatassi
BY Shlesinger, Arkwright & Garvey
ATTORNEY

3,797,204

SMOKE WASHER APPARATUS

OBJECTS OF THE INVENTION

It is an object of this invention to provide smoke washer apparatus including means for establishing a curtain of water through which smoke exhaust passes, for removing contaminants in the form of particulate and gases from the exhaust, preparatory to emitting the cleaned, washed exhaust to the atmosphere.

Another object is to provide apparatus of the character described wherein the line of flow of the smoke exhaust being cleaned is at all times in the general direction of the smokestack in order to prevent jamming of the exhaust in the flue.

A further object is to provide smoke washer apparatus wherein a primary collection tank is provided for receiving water containing contaminants, means being further provided for removing the contaminants from the water to permit recycling and reuse of the water in the apparatus.

A still further object is to provide smoke washer apparatus as described which includes a contaminant collection tank subjacent the primary collection tank, and means for transferring the contaminant from the primary collection tank, the contaminants being removed for disposal or reburning.

Other objects will be apparent from the following description of the presently preferred form of this invention taken in connection with the appended drawing.

DESCRIPTION OF DRAWING

The FIGURE of the drawing is a vertical sectional view illustrating the smoke washer apparatus of the present invention portions thereof being shown in elevation.

DESCRIPTION OF THE INVENTION

The apparatus of the present invention includes a smokestack designated 10 in communication with which is an exhaust flue generally designated 12. Exhaust flue 12 comprises a first portion 14 which is inclined downwardly at an angle of approximately 30° to the horizontal, and is in communication with a second portion 16 which is inclined upwardly at approximately a 30° angle to the horizontal, said second portion being in communication with smokestack 10.

It is a salient feature of the present invention to provide a series of spaced sprinkler heads 17 within the flue passageway, through which water is fed by a water supply pipe 18. The series of sprinkler heads are so arranged in the flue to set up an interlocking curtain of spray whose line of flow is longitudinally of flue portion 14 and generally in the direction of the smokestack to avoid jamming the flow of exhaust.

At the lower end of first flue portion 14, there is provided an opening 20 which is in communication with a tubular member 22 extending vertically downwardly into a primary collection tank 24. It will be noted from the drawing that the debris laden exhaust and water gravitating into the tubular member are expelled at a point near the lower extreme of the primary collection tank, with the result that the heavier particles contained in the water gravitate towards the bottom thereof. The lower portion of the primary collection tank 24 is of hopper-like conformation as indicated at 26 and is provided with a chute 28 through which the particulate passes upon actuation of a conventional valve 30. An inspection window in the hopper-like portion of the primary collection tank is indicated at 32.

The particulate or contaminant passing through chute 28 gravitates to a contaminant collection tank 34, the lower portion of which is of dish-shape to permit liquid to drain therefrom through discharge member 36. The contaminant in collection tank 34 may be removed for disposal or reburning as desired.

Water is fed into primary collection tank 24 through an inlet pipe 37, the water being automatically maintained at a predetermined level by a conventional float valve 38 in a well known manner.

Water is fed from primary collection tank 24 to feed pipe 18 by means of a conventional pump 40 which draws uncontaminated water from the upper portion of primary collection tank 24 and recirculates the water through a supply pipe 42 to feed pipe 18.

OPERATION

In use of the apparatus of the present invention, smoke exhaust is fed through the downwardly inclined portion 14 of flue 12 and, as the exhaust passes therethrough, sprinkler heads 17 arranged longitudinally thereof sets up an interlocking curtain of spray whose line of flow is longitudinally of the flue and generally in the direction of smokestack 10, and in the direction of flow of the smoke exhaust. This sets up a solid screen of water throughout flue portion 14 so that all particulate matter comes in contact with droplets of water and falls to the bottom of portion 14 together with gases which are soluble in water.

As shown in the drawing, the water and debris laden exhaust gravitate through opening 20 into tubular member 22 where they enter primary collection tank 24 near the bottom thereof. The heavier particulate gravitates to the bottom of tank 24 and by operation of valve 30, is removed therefrom through chute 28 into contaminant collection tank 34.

The cleaned, washed exhaust, after passing through the screen of water within first flue portion 14, then enters second flue portion 16 which is inclined upwardly at an angle to the horizontal following which it passes into smokestack 10 for emission into the atmosphere.

Water is fed to sprinkler heads 17 by a recycling process provided by means of a pump 40 and supply pipe 42 which are connected to the upper portion of primary collection tank 24. The water in the upper portion of the primary collection tank is free of particulate matter, and it is therefore suitable for reuse in setting up a screen of water within flue 12. The water within primary collection tank 24 is maintained at a predetermined level by water inlet pipe 37 and automatic float valve 38 connected thereto.

It will be noted from a consideration of the drawing that, by virtue of the present arrangement, the particulate matter removed from the exhaust eventually settles as concentrated debris and may be removed and reprocessed in many cases for reburning. By this arrangement also, the water employed for washing the smoke may be constantly recirculated for reuse, thereby reducing the consumption of water to a minimum. The water supply is recirculated until such time as it becomes saturated with soluble material, at which time the saturated water may be distilled, treated to clean the same or disposed of.

The apparatus of the present invention affords simple but effective means for removing polluting elements from exhaust due to incomplete combustion, which apparatus may be installed at a cost which is considerably less than existing systems, the maintenance of the apparatus being also carried out simply and effectively in several hours. This apparatus additionally affords a more rapid and complete wash of the smoke than has heretofore been possible with less harmful discharge in the smokestack.

While there has been herein shown and described the presently preferred form of this invention it is to be understood that such has been done for purposes of illustration only, and that various changes may be made therein whin the scope of the appended claims.

What I claim is:

1. Smoke washer apparatus comprising:
  a. a smoke stack,
  b. a smoke flue, one end of which is in communication with said smoke stack,
  c. the opposite end of said smoke flue being provided with a smoke inlet,
  d. said smoke flue being of substantially the same cross-sectional area throughout its length,
  e. the smoke flue including a first portion disposed downwardly at an angle to the horizontal,
  f. a plurality of water sprinkler heads positioned within said first portion of the flue,
  g. said sprinkler heads being arranged to provide an interlocking curtain of spray, which spray is directed longitudinally of said first flue portion, whereby the spray removes the contaminants from the smoke without impeding the flow of the smoke through said first portion of the flue,
  h. a primary collection tank in communication with the lower end of said first portion of the flue for receiving water and contaminants gravitating to the bottom of said first portion of the flue,
  i. means for delivering water from said primary collection tank to said sprinkler heads,
  j. a contaminant collection tank adjacent said primary collection tank,
  k. means for drawing off the contaminants from said primary collection tank into said contaminant collection tank, and
  l. a second flue portion in communication with the lower end of said first portion of the flue for receiving the washed smoke therefrom,
  m. said second portion of said flue extending upwardly from said first portion of the flue to an intermediate portion of said smoke stack, for delivering the washed smoke to the smoke stack.

2. The smoke washer apparatus of claim 1, with the addition of:
  a. means for delivering water to said primary collection tank, and
  b. means for maintaining the water in said primary collection tank at a predetermined level.

3. Smoke washer apparatus comprising:
  a. a vertically disposed smoke stack,
  b. a smoke flue extending laterally in the direction of said smoke stack and connected at one end thereto,
  c. the opposite end of said smoke flue being provided with a smoke inlet,
  d. said smoke flue being of substantially the same cross-sectional area throughout its length,
  e. the smoke flue including a first portion inclined downwardly at approximately a 30° angle to the horizontal,
  f. a second portion which is inclined upwardly at approximately a 30° angle to the horizontal,
  g. the lower end of said second flue portion being in communication with the lower end of said first flue portion and the upper end of said second flue portion being in communication with said smoke stack,
  h. a series of spaced sprinkler heads positioned within the passageway of said first flue portion,
  i. said sprinkler heads being arranged to set up an interlocking curtain of spray whose line of flow is longitudinally of said first flue portion and generally in the direction of the smoke,
  j. a primary collection tank positioned beneath the lowest part of said flue,
  k. said first flue portion being provided with an opening at its lowermost end to permit gravitation of water and contaminants therethrough,
  l. a tubular member in the opening extending downwardly into the lower part of said primary collection tank, with the result that the heavier particles contained in the water gravitate towards the bottom thereof, and
  m. means for pumping water from the upper portion of said primary collection tank to said means for supplying water to said sprinkler heads.

4. The smoke washer apparatus of claim 3, with the addition of:
  a. a contaminant collection tank beneath said primary collection tank,
  b. the lower portion of said primary collection tank being of hopper-like conformation,
  c. said hopper-like portion of said primary collection tank being provided with a chute through which the particulate passes to said contaminant collection tank, and
  d. valve means for controlling the passage of particulate through said chute to the contaminant collection tank.

5. The smoke washer apparatus of claim 4, with the addition of:
  a. means for supplying water to the upper portion of said primary collection tank, and
  b. an automatic float valve connected to said means for supplying water to the primary collection tank, for regulating the water level within the primary collection tank.

* * * * *